United States Patent

Argintar

[11] Patent Number: 5,530,951
[45] Date of Patent: Jun. 25, 1996

[54] TELEPHONE LINE SHARING APPARATUS

[76] Inventor: Donald Argintar, 1461 Hudson Rd., Teaneck, N.J. 07666

[21] Appl. No.: 350,529

[22] Filed: Dec. 7, 1994

[51] Int. Cl.⁶ .................................................. H04M 1/72
[52] U.S. Cl. ................ 379/67; 379/164; 379/165; 379/96; 379/98
[58] Field of Search ..................... 379/96, 97, 98, 379/100, 94, 383, 384, 67, 88, 89, 164, 165, 166, 156, 292, 67, 333, 334

[56] References Cited

U.S. PATENT DOCUMENTS

| | | | |
|---|---|---|---|
| 4,584,443 | 4/1986 | Hashimoto | 179/2 A |
| 4,660,218 | 4/1987 | Hashimoto | 379/93 |
| 4,773,080 | 9/1988 | Nakajima et al. | 375/5 |
| 4,831,634 | 5/1989 | McNally et al. | 375/8 |
| 4,862,456 | 8/1989 | Giorgio | 370/118 |
| 4,864,567 | 9/1989 | Giorgio | 370/118 |
| 4,994,926 | 2/1991 | Gordon et al. | 358/400 |
| 5,001,744 | 3/1991 | Nishino et al. | 379/93 |
| 5,003,583 | 3/1991 | Iggulden et al. | 379/100 |
| 5,023,868 | 6/1991 | Davidson et al. | 370/62 |
| 5,029,202 | 7/1991 | Doernbach | 379/201 |
| 5,040,209 | 8/1991 | Greenberg et al. | 379/94 |
| 5,048,076 | 9/1991 | Maurer et al. | 379/102 |
| 5,062,133 | 10/1991 | Melrose | 379/102 |
| 5,090,052 | 2/1992 | Nakajima et al. | 379/98 |
| 5,109,406 | 4/1992 | Mano et al. | 379/94 |
| 5,146,488 | 9/1992 | Okada et al. | 379/88 |
| 5,151,972 | 9/1992 | Lorenx et al. | 379/73 |
| 5,185,784 | 2/1993 | Nashimoto | 379/94 |
| 5,187,736 | 2/1993 | Moriizumi | 379/100 |
| 5,191,604 | 3/1993 | Shigeeda | 379/100 |
| 5,193,110 | 3/1993 | Jones et al. | 379/94 |
| 5,251,254 | 10/1993 | Tanigawa et al. | 379/165 |

OTHER PUBLICATIONS

Black Box Corporation, *Black Box Catalog*, May, 1994, p. 84.

*Primary Examiner*—Jeffrey Hofsass
*Assistant Examiner*—Parag Dharia
*Attorney, Agent, or Firm*—Lerner, David, Littenberg, Krumholz & Mentlik

[57] ABSTRACT

A telephone line sharing apparatus is disclosed for enabling a plurality of telecommunications devices of any type to share a plurality of single subscriber telephone lines. Incoming telephone calls on each of the telephone lines are automatically connected, without answering the telephone calls, to one or more of the telecommunications devices. These connections are made in accordance with a predetermined mapping scheme. An off-hook condition detected on any of the telecommunications devices results in a connection to a telephone line, if available, for making an outgoing telephone call.

11 Claims, 5 Drawing Sheets

MAIN PROCESSING LOOP s1:    WAIT FOR TIMER INTERRUPT s2:    UPDATE LINE STATUS
s3:    UPDATE DEVICE OFF-HOOK TEST STATUS s4:    FOR EACH LINE
s5:        IF LINE IS RINGING
s6:            START RING TIMER
s7:            IF MAPPABLE DEVICE AVAILABLE
s8:                CONNECT LINE TO DEVICE
s9:            IF LINE IS OFF-HOOK
s10:               STOP RING TIMER
s11:       ELSE IF LINE IS ON-HOOK
s12:           IF LINE IS MAPPED
s13:               DISCONNECT DEVICE
s14:       ELSE
s15:           CONNECT NEXT DEVICE FOR OFF-HOOK TEST
s16:       ELSE
s17:           IF CURRENT NOT FLOWING
s18:               DISCONNECT DEVICE s19:    UPDATE SWITCH MATRIX 5,530,951

TELEPHONE LINE SHARING APPARATUS

FIELD OF THE INVENTION

The present invention pertains to telecommunications systems and, more particularly, to telecommunications systems which enable telecommunications devices to share telephone lines.

BACKGROUND OF THE INVENTION

The use of telecommunications devices by businesses and other facilities has expanded rapidly in recent years. Most businesses today employ, e.g., one or more telephone sets, facsimile machines, telephone answering machines and modems.

In order to reduce the cost of providing telephone service for all such devices, apparatuses have been developed for enabling telecommunications devices to share telephone lines. One such apparatus enables a modem, telephone set and facsimile machine to share a single-subscriber telephone line. As used herein, a single-subscriber telephone line means a telephone line normally connected to a single telecommunications device and to which the public telephone network normally assigns a single telephone number. This apparatus answers an incoming telephone call and then directs the call, based upon the signals transmitted by the calling device after doing so, to the telephone set, modem or facsimile machine. The signals transmitted by such devices, after establishing a connection to a called device, all have characteristic indicia. By identifying these indicia, the apparatus identifies the telecommunications device to which the call should be directed. After making this identification, the apparatus generates, and transmits to the identified telecommunications device, a ringing signal. If this telecommunications device answers the ringing signal, the apparatus then makes a connection between this telecommunications device and the telephone line. Examples of such telephone line sharing apparatuses are disclosed in U.S. Pat. Nos. 4,584,434; 4,660,218; 5,151,972 and 5,187,736.

Such telephone line sharing apparatuses, however, are unable to provide telephone line-sharing for a plurality of telecommunications devices of the same type. Also, with such telephone line sharing apparatuses, additional time is required to complete a telephone call. The apparatus must answer the telephone call, determine the telecommunications device to which the telephone call should be directed, and then must transmit a ringing signal to this device.

Manual switch boxes also can be used to provide telephone line sharing. A telephone line is connected to one side of the box, and two or more telecommunications devices are connected to the other side of the box. The box's switch is set to provide a connection between one of the telecommunications devices and the telephone line. In order to provide a connection between another of the telecommunications devices and the telephone line, the switch must be manually reset.

A modem connected to a computer network also can provide telephone line sharing for computers on the network. The modem answers incoming telephone calls and directs these calls to one of the network's computers, in accordance with instructions received from the network's operating system. A computer seeking to make an outgoing data transmission transmits a request over the network to the modem. If the modem is available, a connection then is made between the modem and this computer for making the outgoing transmission.

A private branch exchange (PBX) also provides telephone line sharing. A PBX employs multiplexing techniques and is used as an interface between the public telephone network and a large business or other such facility. The PBX answers incoming telephone calls and then directs these calls to telecommunications devices connected to the PBX in accordance with a protocol executed by a controller. Ringing signals, generated by the PBX, are transmitted to the telecommunications devices for completing the cells.

SUMMARY OF THE INVENTION

The present invention provides an automatic telephone line sharing apparatus which enables a plurality of telecommunications devices to share one or more single-subscriber telephone lines. The apparatus provides automatic telephone line sharing without the disadvantages of a system which intercepts (answers) a telephone call to determine the telecommunications device to which the call should be directed. The present invention can provide automatic telephone line sharing for a plurality of telecommunications devices of any type, including a plurality of telecommunications devices of the same type.

The telephone line sharing apparatus of the present invention directs all incoming telephone calls on a single-subscriber telephone line to one, or a given set, of the telecommunications devices connected to the apparatus. Incoming ringing signals, and voice and data signals, for such calls are transmitted directly to these telecommunications devices, without interception, i.e., without answering the telephone call.

The telephone line sharing apparatus of the present invention comprises at least one input port for providing a connection to a single-subscriber telephone line and at least two output ports for providing connections to at least two telecommunications devices. The apparatus also includes a detecting means for detecting a ringing signal for an incoming telephone call on the telephone line, and a switching means for establishing, in response to the ringing signal, a connection from the input port to at least a first one of the output ports for transmitting the ringing signal to at least a first one of the telecommunications devices connected to the first output port. The device also includes further detecting means for detecting an off-hook condition on a second one of the telecommunications devices connected to a second one of the output ports, and switching means for establishing, in response to the off-hook condition, a connection from the second output port to the input port for transmitting an outgoing telephone call from the second telecommunications device on the telephone line.

The telephone line sharing apparatus of the present invention preferably comprises a solid state crosspoint switch for establishing the connections between the input ports and the output ports and a microprocessor for controlling this switch.

The telephone line sharing apparatus preferably also comprises means for detecting the unavailability of the telecommunications device, or telecommunications devices, to which incoming calls on a telephone line normally are directed and, means, in such an event, for either ignoring the incoming ringing signal or directing this ringing signal to a telecommunications device connected to another one of the apparatus's output ports.

The telephone line sharing apparatus of the present invention preferably also comprises setting means for enabling a user to set the apparatus to transmit incoming telephone calls on a connected telephone line to any one, or any plurality, of the output ports and, therefore, to any one, or any plurality, of the telecommunications devices connected to the apparatus. The apparatus in a normal configuration may transmit, e.g., incoming telephone calls on a first single-subscriber telephone line, connected to a first input port, to a first telecommunications device, connected to a first output port. By changing the setting means, these incoming telephone calls can be transmitted to, e.g., a telecommunications device connected to the second output port.

The telephone line sharing apparatus of the present invention preferably also comprises means for detecting an on-hook condition on a telecommunications device connected to an output port and, upon detecting this condition, for terminating a previously established connection between the telecommunications device and a telephone line. The telephone line sharing apparatus of the present invention, therefore, continuously monitors established connections and terminates these connections upon completion of the telephone calls for which they were established.

The telephone line sharing apparatus of the present invention, therefore, is transparent to the public telephone network, the calling telecommunications devices and the called telecommunications devices. Connections across the apparatus are made automatically. Incoming telephone calls automatically are connected, without answering the calls, to at least one output port to which a telecommunications device is connected. Upon creation of an off-hook condition on any of the connected telecommunications devices, a connection to an available telephone line is established for transmitting an outgoing telephone call.

Since the characteristics of signals transmitted by a calling telecommunications device are not used to determine the telecommunications device to which a call should be directed, the telephone line sharing apparatus of the present invention can provide telephone line sharing for a plurality of telecommunications devices of any type, including a plurality of telecommunications devices of the same type. Since connections between telecommunications devices and single-subscriber telephone lines are direct, without multiplexing, the telephone line sharing apparatus of the present invention can provide telephone line-sharing for high speed telecommunications devices, such as high speed modems.

DESCRIPTION OF THE PREFERRED EMBODIMENTS

Figure 1:
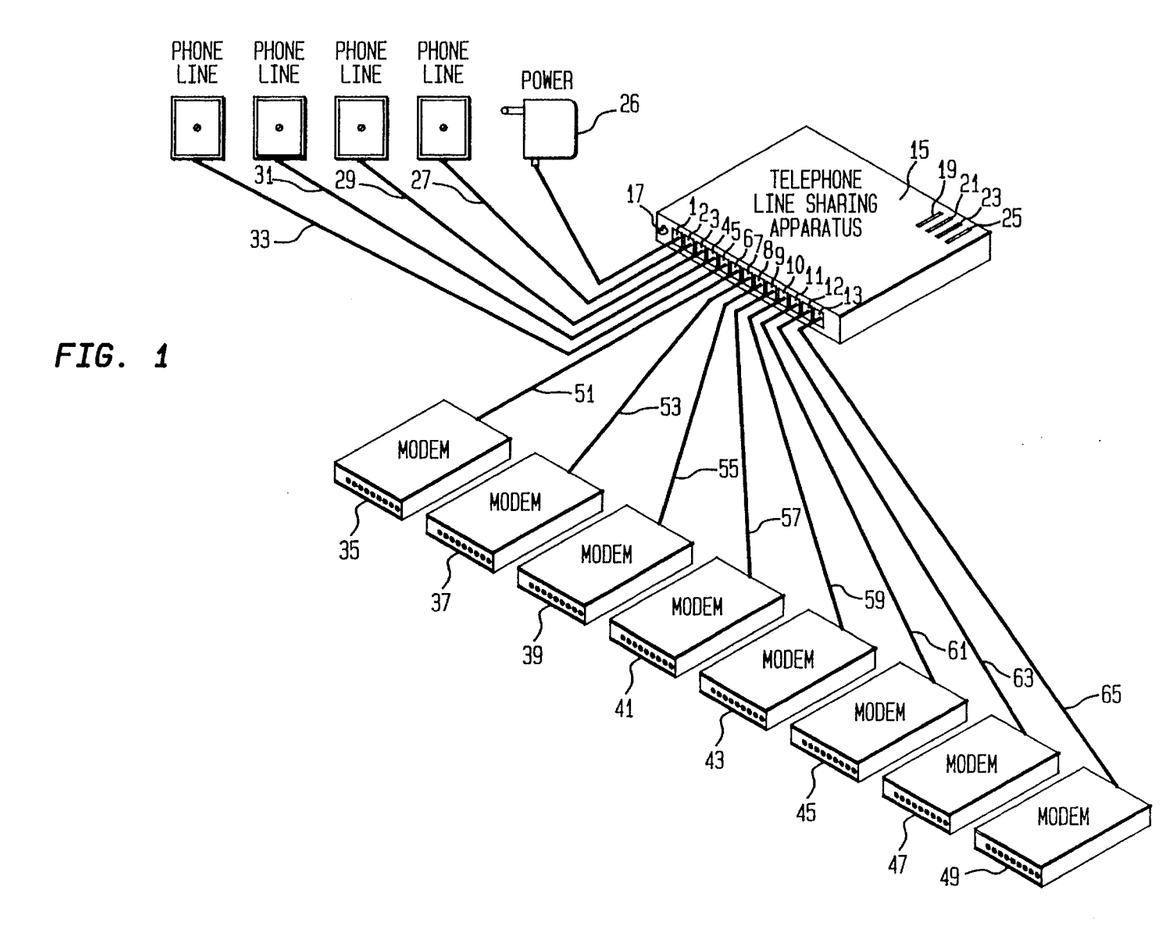
FIG. 1 is a perspective drawing of a telephone line sharing apparatus in accordance with the present invention.

A perspective drawing of a telephone line sharing apparatus 15 in accordance with the present invention is shown in FIG. 1. As shown in this drawing, apparatus 15 has four input ports, viz., input ports 2, 3, 4 and 5, and eight output ports, viz., output ports 6, 7, 8, 9, 10, 11, 12 and 13. Apparatus 15, however, can include any number of input ports and any number of output ports. The number of output ports, however, normally will exceed the number of input ports by at least one.

Input ports 2, 3, 4, and 5 each provide a means for connecting a single-subscriber telephone line to apparatus 15. Output ports 6, 7, 8, 9, 10, 11, 12 and 13 each provide a means for connecting a telecommunications device to apparatus 15. In this embodiment, these means are female RJ-11 jacks. Input ports 2, 3, 4 and 5 are connected to, respectively, single-subscriber telephone lines 27, 29, 31 and 33, and output ports 6, 7, 8, 9, 10, 11, 12 and 13 are connected to, respectively, telecommunications devices 35, 37, 39, 41, 43, 45, 47 and 49 via respectively, internal telephone lines 51, 53, 55, 57, 59, 61, 63 and 65. Although FIG. 1 depicts these telecommunications devices as modems, any other telecommunications device can be connected to an output port of apparatus 15 in addition to, or in place of, a modem, such as, e.g., a facsimile machine, a telephone answering machine or a telephone set. A PBX also can be connected to an output port of apparatus 15.

Telephone line sharing apparatus 15 also includes power transformer 26. This transformer plugs into a conventional 110 V AC power outlet and converts this AC power into 9 V DC for powering the internal components of apparatus 15. LED 17 lights when power from transformer 26 is applied to apparatus 15.

Apparatus 15 also includes dial switches 19, 21, 23, and 25. These switches control the mapping of incoming telephone calls on telephone lines 27, 29, 31 and 33 implemented by apparatus 15. By revolving these switches, a user can select which telecommunications device or devices connected to apparatus 15 receive incoming telephone calls on telephone lines 27, 29, 31 and 33. In lieu of dial switches 27, 29, 31 and 33, other selecting means can be employed for this purpose, such as, e.g., push-buttons, keys, throw-switches, serial ports, etc. In the "normal" setting, dial switches 19, 21, 23 and 25 cause apparatus 15 to transmit incoming telephone calls on telephone lines 27, 29, 31 and 33 to, respectively, the telecommunications devices connected to output ports 6, 7, 8 and 9.

Figure 2:
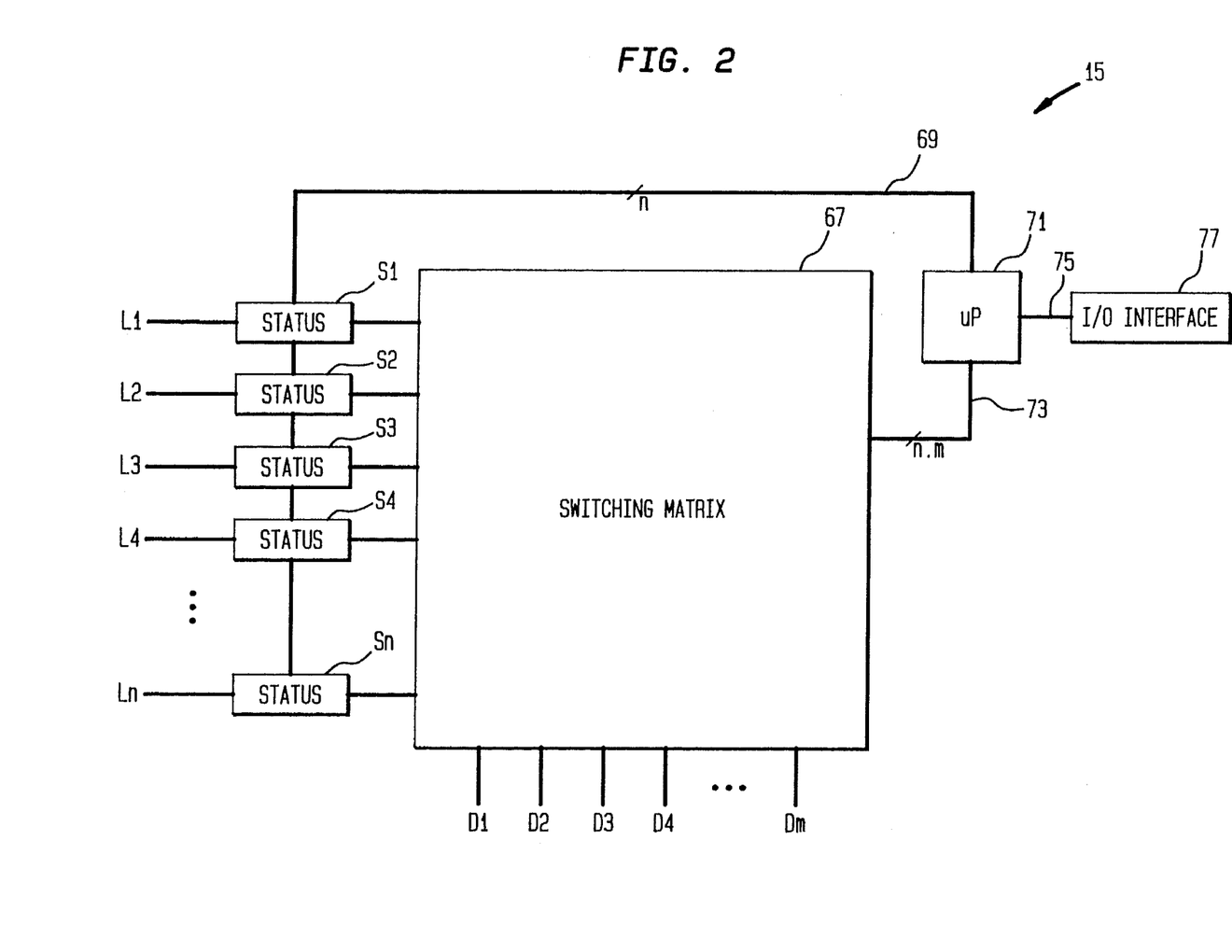
FIG. 2 is a functional block diagram of a telephone line sharing apparatus in accordance with the present invention.

A functional block diagram of apparatus 15 is shown in FIG. 2. As shown in this figure, apparatus 15 contains input ports for any number of single-subscriber telephone lines, designated $L_1$, $L_2$, $L_3$, $L_4$ ... $L_n$, and output ports for any number of telecommunications devices, designated $D_1$, $D_2$, $D_3$, $D_4$ ... $D_m$.

Connections between telephone lines and telecommunications devices are made, and broken, by switching matrix 67. Switching matrix 67 is a solid state crosspoint switch having individual switches for making, and breaking, connections between each single-subscriber telephone lines $L_1$, $L_2$, $L_3$, $L_4$ ... $L_n$ and each telecommunications devices $D_1$, $D_2$, $D_3$, $D_4$ ... $D_m$. Switching matrix 67 comprises, therefore, n×m individual switches. Each of these individual switches is controlled by microprocessor 71 through the transmission of signals on output bus 73. In lieu of a solid state switching matrix, mechanical relays can be employed for switching matrix 67.

The status of telephone lines $L_1$, $L_2$, $L_3$, $L_4$ ... $L_n$ is detected by, respectively, status detectors $S_1$, $S_2$, $S_3$, $S_4$ ... $S_n$. Each detector detects, for the telephone line with which it is associated, the current status, the voltage status and the presence or absence of a ringing signal on the telephone line. This information is transmitted to microprocessor 71 on bus 69.

Apparatus 15 also includes microprocessor input/output interface 77. This interface transmits to microprocessor 71, over line 75, mapping information for incoming calls selected by the user using dial switches 19, 21, 23 and 25. Other programming, or reprogramming, of microprocessor 71 also can be effected through input/output interface 77.

Figure 3:
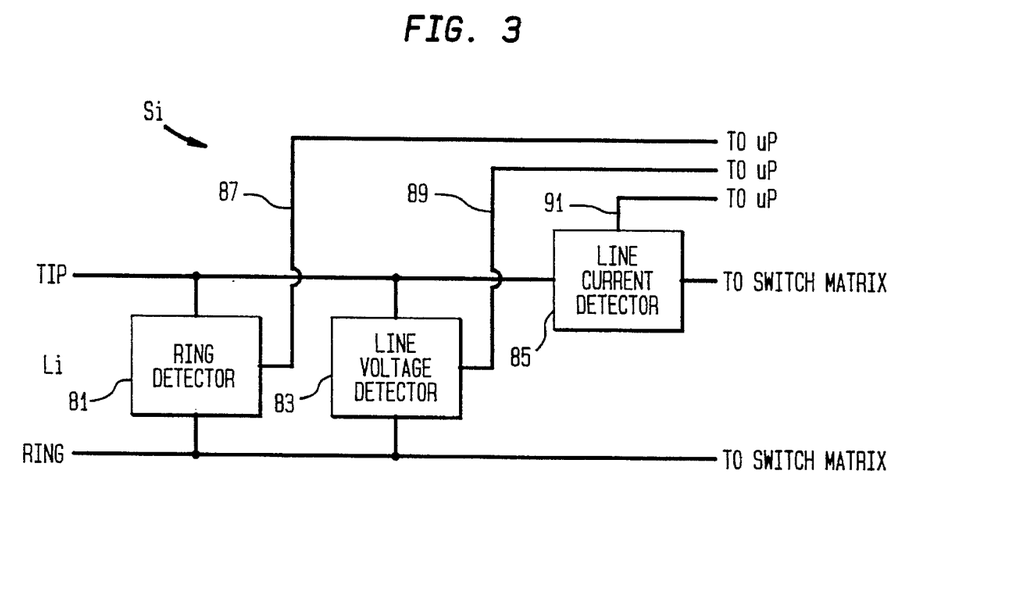
FIG. 3 is a functional block diagram for the status detectors shown in FIG. 2.

FIG. 3 is a functional block diagram for one of the status detectors $S_1, S_2, S_3, S_4 \ldots S_n$, designated in this figure as status detector $S_i$, associated with one of the telephone lines $L_1, L_2, L_3, L_4 \ldots L_n$, designated in this figure as telephone line $L_i$. Status detector $S_i$ includes ring detector 81, line voltage detector 83 and line current detector 85. Ring detector 81 is connected between the tip and ring lines of telephone line $L_i$ and detects the presence of a ringing signal transmitted from the telephone network on this line. Ring detector 81 also distinguishes among the different ringing patterns of a distinctive ringing service from the telephone network. Such a service enables more than one telephone number to be assigned to a single telephone line. In lieu of ring detector 81, the existence of a ringing signal on telephone line $L_i$ can be detected by microprocessor 71 using the outputs from line voltage detector 83 and line current detector 85. The ring detector used in this embodiment is Texas Instrument Model No. TCM1520A.

Line voltage detector 83 also is connected between the tip and ring lines of telephone line $L_i$. Line voltage detector 83 detects the presence of the characteristic voltage occurring between these lines during the on-hook condition. This voltage causes line voltage detector 83 to produce a positive output.

Line current detector 85 is connected in series with the tip and ring lines of telephone line $L_i$. Line current detector 85 detects the presence of the current on line $L_i$ normally occurring during an on-going telephone call. This current causes line current detector 85 to produce a positive output.

The outputs from ring detector 81, line voltage detector 83 and line current detector 85 are transmitted to microprocessor 71 on, respectively, lines 87, 89 and 91. Each of these detectors is optically isolated from the telephone line by AC optical couplers (not shown). Such couplers enable the connection of the tip and ring lines to apparatus 15 in any polarity. The AC optical coupler used in this embodiment is Quality Technology Part No. H11AA4.

Figure 4:
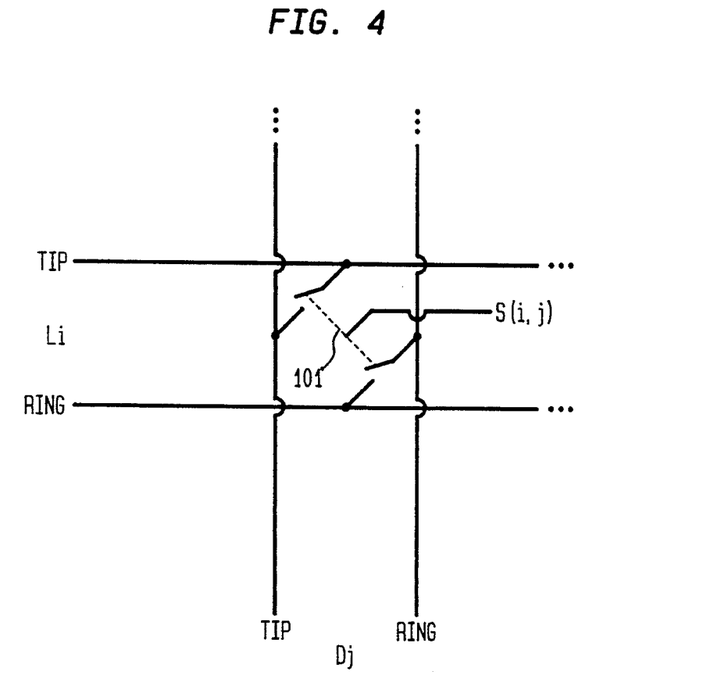
FIG. 4 is a schematic diagram for a switch of the switching matrix shown in FIG. 2.

The structure of one switch of switching matrix 67 is shown in FIG. 4. This switch, designated switch 101, connects single-subscriber telephone line $L_i$ to telecommunications device $D_j$. Switch 101 is a solid state 2 Form A relay controlled by signals from microprocessor 71 on control line S(i,j). When switch 101 is closed, the tip and ring lines for telephone line $L_i$ are connected to, respectively, the tip and ring lines for telecommunications device $D_j$. Each control line for each switch of switching matrix 67 also is optically isolated from the telephone line by optical couplers (not shown). In this embodiment, each switch of switching matrix 67 is AT&T Part No. LH1503AB. In lieu of a solid state 2 Form A switch, a mechanical relay of the same type can be used for each switch of switching matrix 67. As another example, a 2 Form B switch also can be used for each switch of switching matrix 67.

Microprocessor 71 controls the opening and closing of the switches of switching matrix 67 in accordance with a predetermined mapping scheme for connecting incoming telephone calls on telephone lines $L_1, L_2, L_3, L_4 \ldots L_n$ to selected ones of telecommunications devices $D_1, D_2, D_3, D_4 \ldots D_m$. Microprocessor 71 can effect any mapping scheme. For example, incoming telephone calls on telephone lines $L_1, L_2, L_3, L_4 \ldots L_n$ can be connected to, respectively, telecommunications devices $D_1, D_2, D_3, D_4 \ldots D_n$. On the other hand, for any one of the telephone lines, e.g., telephone line $L_1$, incoming telephone calls can be connected to both telecommunications devices $D_1$ and $D_2$, or first to telecommunications device $D_1$ and, if telecommunications device $D_1$ is unavailable or does not answer the call, then to telecommunications device $D_2$. Also, if one of telephone lines $L_1, L_2, L_3, L_4 \ldots L_n$ includes a distinctive ringing pattern, incoming telephone calls on this line preceded by a first ringing pattern can be connected to telecommunications device $D_1$, and incoming telephone calls on this line preceded by a second ringing pattern can be connected to telecommunications device $D_2$. A mapping scheme can be employed, moreover, in which some telephone lines are dedicated solely to outgoing telephone calls from the telecommunications devices connected to apparatus 15. In such a case, microprocessor 71 can be programmed to effect no connection to any telecommunications device for incoming telephone calls on these telephone lines.

Microprocessor 71 detects the presence of an incoming telephone call on each of telephone lines $L_1, L_2, L_3, L_4 \ldots L_n$ by detecting the presence of a positive output from the ring detector associated with the line. If, e.g., microprocessor 71 is programmed to connect incoming telephone calls on telephone line $L_i$ to telecommunications device $D_i$, microprocessor 71, in response to a ringing signal on this telephone line, first determines whether telecommunications device $D_i$ is on-hook and available for receiving an incoming telephone call. If so, microprocessor 71 transmits a signal over control line S(i,j) to cause switch 101 to close. This closure results in the transmission to telecommunications device $D_i$ of the ringing signal transmitted by the telephone network for this incoming telephone call. The incoming telephone call will be answered, therefore, only if telecommunications device $D_i$ answers the call in a conventional manner (e.g., if telecommunications device $D_i$ is a telephone set, the handset of this telephone set is lifted by the user).

On the other hand, if telecommunications device $D_i$ is unavailable for receiving an incoming telephone call (e.g., is disconnected from apparatus 15 or is in use on another telephone call), microprocessor 71 transmits no signal over control line S(i,j) to switch 101. As a result, telecommunications device $D_i$ does not respond to the ringing signal. The calling telecommunications device, or the telephone network, eventually terminates transmission of the ringing signal.

If an outside telecommunications device attempts to call the telephone number assigned to one of telephone lines $L_1, L_2, L_3, L_4 \ldots L_n$ and this telephone line is in use, either for a previous incoming telephone call or a previous outgoing telephone call from one of the telecommunications devices connected to apparatus 15, the telephone network will transmit a busy signal to the calling telecommunications device in a conventional manner.

Microprocessor 71 detects a request to make an outgoing telephone call from one of the telecommunications devices connected to apparatus 15 by continuously monitoring the on-hook/off-hook status of these telecommunications devices. This monitoring is effected by sequentially connecting available ones of telephone lines $L_1, L_2, L_3, L_4 \ldots L_n$ to available ones of telecommunications devices $D_1, D_2, D_3, D_4 \ldots D_n$. If a 2 Form C (or similar) type relay is employed for the switches of switching matrix 67, such monitoring can be effected using local monitoring loops without connecting these telecommunications devices to these telephone lines.

If an off-hook condition is detected on an available telecommunications device, e.g., telecommunications device $D_i$, microprocessor 71 concludes that this telecommunications device is requesting to make an outgoing telephone call. In response, microprocessor 71 determines whether one of telephone lines $L_1$, $L_2$, $L_3$, $L_4$ ... $L_n$ is available for making an outgoing telephone call. If one of these telephone lines is so available, e.g., telephone line $L_j$, microprocessor 71 transmits a signal over control line S(i,j) to close switch 101. As a result, telecommunications device $D_i$ will receive a dial tone from the telephone network and can make the outgoing telephone call in a conventional manner.

On the other hand, if no telephone line is available for making the outgoing telephone call, microprocessor 71 transmits no signal to any of the switches of switching matrix 67. No connection, therefore, is effected between telecommunications device $D_i$ and any of the telephone lines. As a result, telecommunications device $D_i$ will detect no dial tone and will respond as a telecommunications device connected to a dead telephone line. A facsimile machine typically will reschedule the transmission for a later time. A modem typically will return a "no dial tone" message to the computer attempting to use the modem for a data transmission. The user of a telephone set typically will hang up the handset and attempt the call at a later time.

Microprocessor 71 continuously monitors the outputs from the ring detector, the line voltage detector and the line current detector for each telephone line $L_1$, $L_2$, $L_3$, $L_4$ ... $L_n$. The output from the ring detector indicates whether a ringing signal for an incoming telephone call is being transmitted from the telephone network for the associated telephone line. The output from the line voltage detector indicates whether the telecommunications device connected to the associated telephone line is on-hook. The output from the line current detector indicates whether the telecommunications device connected to the associated telephone line is involved in an on-going telephone call. The logic employed by microprocessor 71 is as follows:

If the output from the ring detector is positive, microprocessor 71 concludes that the associated telephone network is transmitting a ringing signal on the telephone line for an incoming telephone call. The outputs from the line voltage detector and the line current detector are ignored in this case.

If a negative output is detected on the ring detector, then, based upon the outputs from the line voltage detector and the line current detector, microprocessor 71 concludes the following: (1) if the output from the line voltage detector is negative and the output from the line current detector is negative, the telephone line is either dead or disconnected from apparatus 15; (2) if the output from the line voltage detector is negative and the output from the line current detector is positive, the telephone line is connected to a telecommunications device which is off-hook; (3) if the output from the line voltage detector is positive and the output from the line current detector is negative, the telephone line is functioning, connected to apparatus 15 and available for use; and (4) if the output from the line voltage detector is positive and the output from line current detector is positive, a ringing signal has begun on the telephone line which has not yet been detected by the ring detector.

Figure 5:
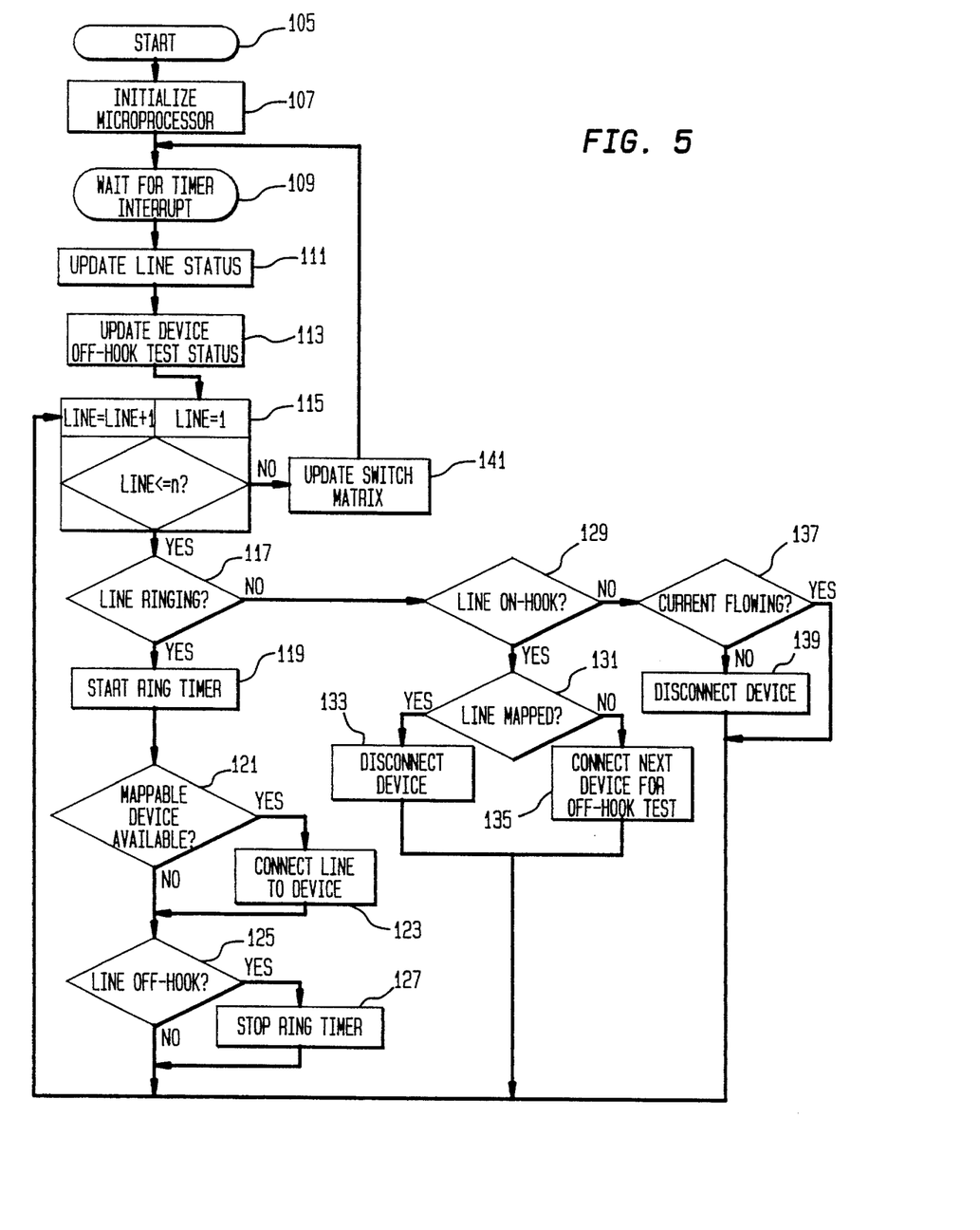
FIG. 5 is a flow diagram for the program executed by the microprocessor shown in FIG. 2.

FIG. 5 is a flow diagram of the program executed by microprocessor 71. The program begins at block 105 and advances to block 107 where microprocessor 71 is initialized for the main processing loop.

At block 109, microprocessor 71 waits for the receipt of an interrupt signal from an on-board timer which occurs every 10 milliseconds. This period provides sufficient time for microprocessor 71 to analyze the outputs from the ring detectors, line voltage detectors and line current detectors for each of the telephone lines connected to apparatus 15. Upon receipt of an interrupt signal, microprocessor 71 records in an associated database (not shown), e.g., a RAM, the outputs from each of these detectors. A conventional filtering subroutine is employed to filter from these outputs spurious line noise, e.g., noise from jitter, lightning strikes, rotary dial tapping, etc. The program then advances to block 113.

At block 113, the connections effected between available telephone lines and available telecommunications devices during the previous iteration of the main processing loop are assessed. These connections were made for determining whether any of these telecommunications devices are requesting use of a telephone line to make an outgoing telephone call. To make this assessment, microprocessor 71 delays for 10 milliseconds to allow the detectors to respond to an off-hook condition on these telecommunications devices. Following this delay, microprocessor 71 records in its associated database the on-hook/off-hook status of each of these telecommunications devices.

For each telecommunications device determined to be off-hook, microprocessor 71 leaves the connection made for performing the assessment in place. As a result, each such telecommunications device remains connected to a telephone line for making an outgoing telephone call. Microprocessor 71 also records in its associated database that this telephone line is in use.

For each telecommunications device determined to be on-hook, microprocessor 71 transmits a signal to switching matrix 67 to open the connection between this telecommunications device and the telephone line. As a result, these telephone lines become available for further use. Microprocessor 71 also records this status in its associated database.

Following these steps, the program advances to block 115 where a variable, called "line," is initialized at one. Microprocessor 71 then determines whether "line" is less than or equal to n (the number of telephone lines connected to apparatus 15).

If "line" is less than or equal to n, the program advances to block 117 where microprocessor 71 determines whether a positive output exists on the ring detector associated with telephone line 1. If such an output exists, the program advances to block 119.

At block 119, microprocessor 71 starts an internal ring timer which provides a positive output during the inactive phases of the ringing signal. This output causes microprocessor 71 to conclude that a ringing signal also is present on line 1 during this inactive phase.

At block 121, microprocessor 71 determines whether the mapping scheme for apparatus 15 includes a telecommunications device for receiving incoming telephone calls on telephone line 1 and, if so, whether this telecommunications device is available for receiving such telephone calls. If so, the program advances to block 123 where microprocessor 71 records in memory a message to transmit, at the conclusion of the main processing loop, a signal to the appropriate switch of switching matrix 67 for effecting a connection between line 1 and this telecommunications device. The program then advances to block 125.

On the other hand, if at block 121, microprocessor 71 determines that the mapping scheme for apparatus 15 does not include such a device, or that such a device is unavailable, the program advances directly to block 125.

At block 125, microprocessor 71 determines whether an off-hook condition has occurred for the mapped telecommunications device for line 1. If so, microprocessor 71 concludes that this telecommunications device has answered the incoming telephone call. The program, therefore, advances to block 127 where the ring timer is stopped. The program then returns to block 115.

On the other hand, if at block 125 microprocessor 71 determines that the mapped telecommunications device for line 1 is on-hook, the microprocessor does not stop the ring timer. The program also returns from this block to block 115.

If at block 117, microprocessor 71 determines that the output from the ring detector associated with line 1 is negative, the program advances to block 129 where microprocessor 71 determines whether the output from the voltage detector associated with line 1 is positive. If so, the microprocessor concludes that the telecommunications device connected to line 1 is on-hook, and the program advances to block 131.

At block 131, the microprocessor determines whether line 1 is connected to a telecommunications device for an incoming telephone call pursuant to the mapping scheme. If so, the program advances to block 133 where, since line 1 now is on-hook, microprocessor 71 records in memory a message to transmit, at the conclusion of the main processing loop, a signal to switching matrix 67 to open the switch connecting line 1 to this telecommunications device. The program then returns to block 115.

On the other hand, if at block 131 microprocessor 71 determines that line 1 is not connected to a telecommunications device for an incoming telephone call pursuant to the mapping scheme, the program advances to block 135 where microprocessor 71 records in memory a message to transmit a signal to the appropriate switch of switching matrix 67 to connect line 1, at the conclusion of the main processing loop, to the next available telecommunications device for effecting, at block 113, the testing scheme for outgoing call requests. Following this step, the program returns to block 115.

If at block 129, the program determines that the output from the voltage detector associated with line 1 is negative, the program advances to block 137 where microprocessor 71 determines whether the output from the current detector associated with line 1 is negative. Such an output, when the output of the voltage detector also is negative, indicates either the disconnection of line 1 from apparatus 15 or the malfunctioning of this line. In such a case, the program advances to block 139 where microprocessor 71 records in memory a message to transmit, at the conclusion of the main processing loop, a signal to the appropriate switch of switching matrix 67 to disconnect the telecommunications device connected to line 1. This disconnection frees this telecommunications device for subsequent use. The program then returns to block 115.

On the other hand, if at block 137 microprocessor 71 determines that the output from the current detector associated with line 1 is positive, the program returns directly to block 115.

Upon return to block 115, the value of the variable "line" is set to equal "line" plus one. If "line" then is greater than n, the program advances to block 141 where signals, corresponding to the messages previously recorded in memory at blocks 123, 133, 135 and 139 for the various connections and disconnections between telephone lines and telecommunications devices, are transmitted to switching matrix 67 for effecting these connections and disconnections. The program then returns to block 109 to await the next interrupt signal.

Figure 6:
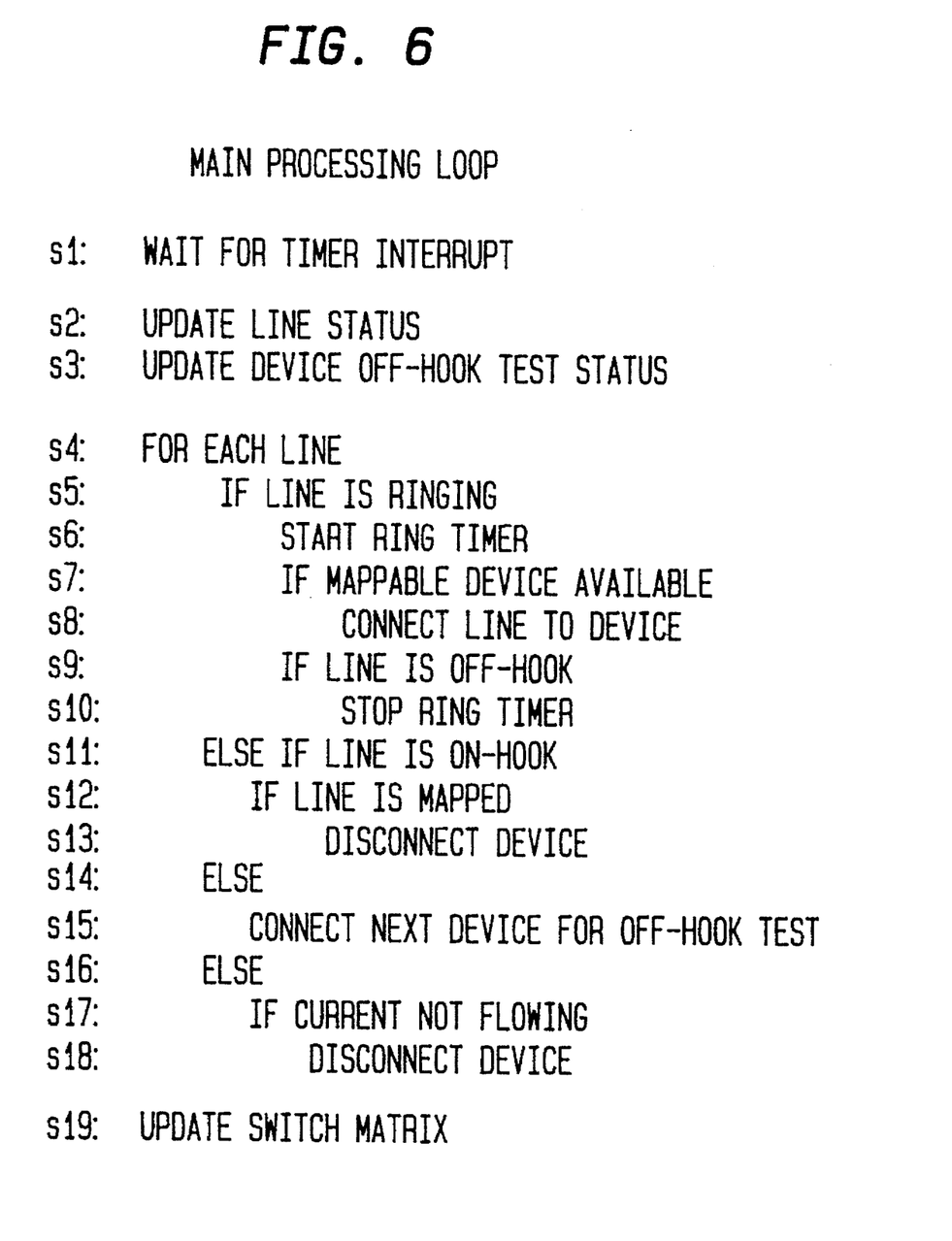
FIG. 6 is a listing of the pseudo-code for the program executed by the microprocessor shown in FIG. 2.

A listing of the pseudo code executed by microprocessor 71 in accordance with the flow diagram of FIG. 5 is shown in FIG. 6.

I claim:

1. A telephone line sharing apparatus for enabling a plurality of telecommunications devices to share a plurality of single-subscriber telephone lines provided by a public telephone network, said apparatus comprising:

(a) a plurality of input ports, each of said input ports comprising means for connecting said input port to one of said single-subscriber telephone lines;

(b) a plurality of output ports, each of said output ports comprising means for connecting said output port to one of said telecommunications devices, said plurality of output ports being greater than said plurality of input ports;

(c) first detecting means for detecting a first ringing signal, generated by said public telephone network, for a first incoming telephone call on a first one of said single-subscriber telephone lines connected to a first one of said input ports;

(d) first switching means for establishing, in response to said detecting of said first tinging signal, a first connection from said first input port to at least a first one of said output ports for transmitting said first ringing signal to at least a first one of said telecommunications devices connected to said first output port;

(e) second detecting means for detecting a second ringing signal generated by said public telephone network, for a second incoming telephone call on a second one of said single-subscriber telephone lines connected to a second one of said input ports;

(f) second switching means for establishing, in response to said detecting of said second tinging signal, a second connection from said second input port to at least a second one of said output ports for transmitting said second ringing signal to at least a second one of said telecommunications devices connected to said second output port;

(g) third detecting means for detecting an off-hook condition on a third one of said telecommunications devices connected to a third one of said output ports and for detecting the availabilities of said first telephone line and said second telephone line for transmitting an outgoing telephone call; and (h) third switching means for establishing, in response to said detecting of said off-hook condition and said availabilities, a third connection from said third output port to either said first input port or said second input port for transmitting said outgoing telephone call from said third telecommunications device on an available one of said first telephone line and said second telephone line.

2. A telephone line sharing apparatus as in claim 1, wherein said first, second and third Switching means comprise a solid state crosspoint switch.

3. A telephone line sharing apparatus as in claim 2, further comprising microprocessor means for controlling said crosspoint switch.

4. A telephone line sharing apparatus as in claim 1, further comprising setting means for enabling a user to set said first switching means or said second switching means to establish said first connection or said second connection to one of said output ports other than said first output-port and second output port.

5. A telephone line sharing apparatus as in claim 1, wherein said telecommunications devices are selected from the group consisting of facsimile machines, telephone answering machines, telephone sets, modems and PBXs.

6. A telephone line sharing apparatus as in claim 5, wherein said telecommunications devices are selected from said group such that all of said telecommunications devices are of the same type.

7. A telephone line sharing apparatus as in claim 1, wherein said third detecting means comprises means for detecting the unavailability of said first and second telephone lines for transmitting said outgoing telephone call, and said third switching means comprises means for establishing, in response to said unavailability, said third connection to a third one of said single-subscriber telephone lines connected to a third one of said input ports.

8. A telephone line sharing apparatus as in claim 1, wherein said apparatus comprises means for detecting an off-hook condition on said first telecommunications device, said first switching means comprises means for ignoring said first ringing signal in response to said off-hook condition on said first telecommunications device, said apparatus comprises means for detecting an off-hook condition on said second telecommunications device, and said second switching means comprises means for ignoring said second ringing signal in response to said off-hook condition on said second telecommunications device.

9. A telephone line sharing apparatus as in claim 1, wherein said apparatus comprises means for detecting an off-hook condition on said first telecommunications device, said first switching means comprises means for establishing, in response to said off-hook condition on said first telecommunications device, said first connection to one of said output ports other than said first output port, said apparatus comprises means for detecting an off-hook condition on said second telecommunications device, and said second switching means comprises means for establishing, in response to said off-hook condition on said second telecommunications device, said second connection to one of said output ports other than said second output port.

10. A telephone, line sharing apparatus as in claim 1 wherein said apparatus comprises means for detecting a first on-hook condition on said first telecommunications device, following completion of said first incoming telephone call, said first switching means comprises means for terminating said first connection in response to said first on-hook condition, said apparatus comprises means for detecting a second on-hook condition on said second telecommunications device, following completion of said second incoming telephone call, and said second switching means comprises means for terminating said second connection in response to said second on-hook condition.

11. A telephone line sharing apparatus as in claim 1, wherein said apparatus comprises means for detecting an on-hook condition on said third telecommunications device, following completion of said outgoing telephone call, and said third switching means comprises means for terminating said third connection in response to said on-hook condition.

* * * * *

UNITED STATES PATENT AND TRADEMARK OFFICE
CERTIFICATE OF CORRECTION

PATENT NO. : 5,530,951
DATED : June 25, 1996
INVENTOR(S) : Argintar

It is certified that error appears in the above-indentified patent and that said Letters Patent is hereby corrected as shown below:

Column 2, line 9, "cells" should read --calls--.

Column 10, line 31, after "signal" insert --,--;
          line 36, "tinging" should read --ringing--;
          line 57, "Switching" should read --switching--;
          line 66, "output-port" should read --output port--.

Column 12, line 11, "A telehone, line" should read --A telephone line".

Signed and Sealed this

Twenty-second Day of October, 1996

Attest:

BRUCE LEHMAN

*Attesting Officer*      *Commissioner of Patents and Trademarks*